No. 751,402. PATENTED FEB. 2, 1904.
J. McKAY.
FOOT BALL VALVE AND CONNECTED PARTS.
APPLICATION FILED SEPT. 28, 1903.
NO MODEL.

Witnesses.

Inventor
John McKay.
by Wilkinson & Fisher
his Attorneys

No. 751,402. Patented February 2, 1904.

UNITED STATES PATENT OFFICE.

JOHN McKAY, OF CAPE TOWN, CAPE COLONY.

FOOT-BALL VALVE AND CONNECTED PARTS.

SPECIFICATION forming part of Letters Patent No. 751,402, dated February 2, 1904.

Application filed September 28, 1903. Serial No. 174,982. (No model.)

*To all whom it may concern:*

Be it known that I, JOHN McKAY, a subject of the King of Great Britain and Ireland, &c., residing at 35 Weltevreden Street Gardens, Cape Town, Cape Colony, have invented certain new and useful Improvements in Foot-Ball Valves and Connected Parts; and I do hereby declare the following to be a full, clear, and exact description of the invention, such as will enable others skilled in the art to which it appertains to make and use the same.

The object of this invention is to provide simple improvements in foot-ball valves and connected parts, a metallic valve inflatable by an ordinary tire-inflater or the like being used, it being necessary when about to distend the bladder to screw off in any well-known way the cap of the device and apply the inflater.

Part of the device relates to the means for the admission of air to and to the deflation of the bladder and is constructed according to details which are well known, especially in connection with valves of Dunlop tires. Lacing of the leather cover in the usual way after inflation is dispensed with without, however, discarding lacing wholly. The objectionable irregularity or lumpiness of exterior surface apt to appear in ordinarily-laced foot-balls is avoided. The invention withstands hard usage in the field. Part of the valve-casing is fixed permanently inside the bladder during the making of the latter.

I shall now describe the parts used and their operation and then state what is claimed.

Figure 1:
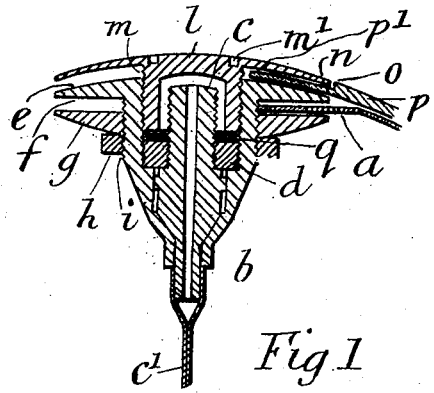
Figure 3:
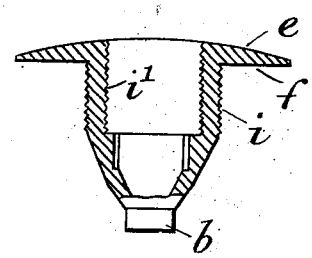
Figure 2:
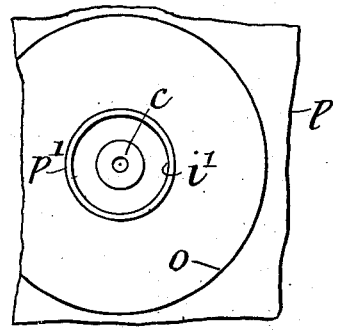
Figure 4:
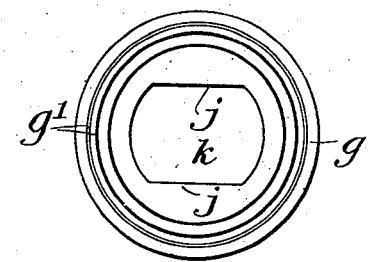
Figure 5:
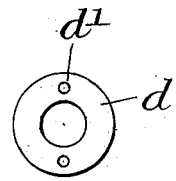

Figure 1 in the drawings herewith shows, partly in longitudinal section, the complete valve, also part of the bladder and leather cover, of a foot-ball. Fig. 2 is an external view, omitting the cap, of the foot-ball in the region of the valve. Fig. 3 shows the valve-casing partly in longitudinal section. Fig. 4 is a plan of the ring against which the inside of the bladder is firmly secured, and Fig. 5 is the plan of a nut used within the valve-casing. The proportions of the parts are not restricted to those shown, and the size may be much smaller and minor details generally may be modified so long as essential features are retained.

The bladder $a$ has a small aperture sufficient to admit within it the stem of the valve-casing $b$. A valve arrangement of any suitable construction is employed. In the drawings I have illustrated the valve as comprising a tube member, fitted removably within the casing $b$, screw-threaded at one end to form a nozzle $c$ and reduced at its other end to receive a thin rubber collapsible tube $c'$, allowing air to be forced inward, but not to escape outward, the rubber tube being shown in its collapsed or closed position in Fig. 1. The stem of the casing $b$ is screw-threaded externally at $i$ and internally at $i'$. An externally-threaded removable nut $d$, engaging thread $i'$, secures the inflation-valve tube on its seat. Recesses $d'$ in (but not passing through) nut $d$ are provided to receive the points of an instrument which when rotated will remove or insert the nut as required and as will be well understood. The outer end of casing $b$ consists of a flange the outer convex surface of which, $e$, is to contact with the inside of the leather cover of the foot-ball and the inner surface $f$ with the outside of bladder $a$. The inside of the bladder contacts with the surface of a ring $g$, having an aperture $k$ with straight sides $j$ to correspond with the shape of the screw-threaded part of stem $b$, over which said ring is fitted, this arrangement being to make ring $g$ non-revoluble around stem $b$ and the latter non-revoluble relatively to the bladder. A nut $h$, engaging thread $i$, causes (when screwed home under ring $g$) the bladder to be firmly gripped between ring $g$ and surface $f$. Lines $g'$ indicate shallow grooving or the like provided usually on both ring $g$ and surface $f$ to make the said grip stronger and absolutely air-tight, and cement is added when desired. As the valve-casing is secured to the bladder in the making of the latter, the only part of the casing visible externally is face $e$, while the leather cover $p$ has either no lacing or the lacing is at some other part of the leather surface and does not need attention when the valve is being operated. The cover $p$ has, however, a hole $p'$, somewhat larger than the externally-screwed hollow shank $m$ of the cap $l$, which has a flange $n$, (convex externally and concave internally,) between which flange and convex surface *e* the leather cover around the edges of the hole *p'* is gripped, when the shank *m* is screwed home, engaging thread *i'*. The leather under the screw-cap *l* is compressed tightly upon surface *e* of the flange, which is integral with the rest of casing *b*, *o* being a shoulder or countersinking accordingly produced in *p*, the thin edge of the downwardly-curving flange *n* being thus protected, and catching against said edge when the ball is kicked being prevented. This is important, as any defect arising in this respect might prove disastrous. To unscrew the cap, a suitable instrument is used, as one having points, to enter two holes *m'* in but not penetrating said cap. To render the cap additionally tight when screwed down, a rubber disk *q* is seated on nut *d* and compressed when shank *m* is screwed down, the compression forcing the disk against thread *i'* and against the inflation-tube, preventing loosening of nut *d* by jarring.

In Fig. 1, for clearer illustration, the parts are shown not fully screwed home.

What I claim as my invention, and desire to secure by Letters Patent of the United States, is—

1. In pneumatic devices having an inflatable member and a cover therefor, the combination of a valve-casing secured to said inflatable member independently of said cover, a valve within said casing, and a cap for said valve provided with means coöperating with said casing for securing said cover firmly thereto.

2. In pneumatic devices having an inflatable member, and a cover therefor, the combination of a valve-casing provided at its upper end with an annular outwardly-extending flange, means coöperating with the under face of said annular flange for securing said casing to said inflatable member independently of said cover, a valve within said casing, and a cap for said valve provided with means coöperating with said annular flange on said casing for securing said cover firmly thereto.

3. In pneumatic devices having an inflatable member and a cover therefor, the combination of a valve-casing provided with a pair of outwardly-extending annular flanges, one of said flanges being adjustably supported on said casing and coöperating with the other said flange for securing said casing to said inflatable member independently of said cover, a valve within said casing, and a cap for said valve provided with an annular flange and adapted to coöperate with the upper flange of said casing for securing said cover firmly thereto.

4. In pneumatic devices having an inflatable member and a cover therefor, the combination of a valve-casing provided at its upper end with an annular outwardly-extending flange, a flange-ring adjustably supported externally of said casing beneath said annular flange and coöperating therewith for securing said casing to said inflatable member independently of said cover, a valve within said casing, and a cap for said valve provided with an annular curved flange adapted to coöperate with said casing annular flange for securing said cover firmly thereto.

5. In pneumatic devices having an inflatable member and a cover therefor, the combination of a valve-casing provided with a pair of outwardly-extending annular flange-rings, one of said flange-rings being non-rotatably mounted but adjustable longitudinally of said casing and coöperating with the other said flange-ring for securing said casing to the said inflatable member independently of said cover, a valve within said casing, and a cap for said valve provided with an annular flange coöperating with the upper of said flange-rings for securing said cover firmly therebetween.

6. In pneumatic devices having an inflatable member and a cover therefor, the combination of an internally-screw-threaded valve-casing provided with a pair of outwardly-projecting flange-rings, one of said rings being adjustable relatively to the other for securing said casing to said inflatable member independently of said cover, a valve within said casing, a cap for said valve comprising a hollow externally-screw-threaded shank portion, and an upper annular curved flanged portion adapted to coöperate with the upper of said flange-rings for securing said cover firmly therebetween.

7. In pneumatic devices having an inflatable member and a cover therefor, the combination of an internally and externally screw-threaded valve-casing provided at its upper end with an annular outwardly-projecting flange, a longitudinally-adjustable flange-ring on said casing below said annular flange, a nut engaging said external screw-threads for adjusting said flange-ring and securing said casing to said inflatable member independently of said cover, a valve within said casing, and a cap for said valve having a screw-threaded hollow shank and an annular curved flange coöperating with said casing-flange for securing said cover firmly therebetween.

8. In combination, a casing having within it an inflation-valve (secured on its seat by a removable nut) and having an internally and externally screw-threaded stem, and at its outer end a flange having a convex outer surface; means for securing the outer side of the foot-ball bladder air-tight to the inner side of said flange; a cap having an externally-screw-threaded hollow shank engaging the said internal thread, and a flange convex externally and concave internally, to compress the leather foot-ball cover upon the convex surface of the flange of the aforesaid casing.

9. In pneumatic devices having an inflatable member, and a cover therefor, the combination of an internally-screw-threaded valve-casing provided with a pair of outwardly-extending flange-rings, one of said rings being adjustable longitudinally of but non-rotatable on said casing, for securing said casing to said inflatable member independently of said cover, a removable nut within said casing for securing said valve on its seat, a cap for said valve comprising an externally-screw-threaded hollow shank portion, and a curved annular flanged portion adapted to coöperate with the upper of said flange-rings for securing said cover firmly therebetween, and packing between said inner removable nut and cap-shank.

In testimony whereof I affix my signature in presence of two witnesses.

JOHN McKAY.

Witnesses:
  JOHN SYMMONDS,
  GEO. RADLEY.